United States Patent [19]
Tamari et al.

[11] Patent Number: 6,165,608
[45] Date of Patent: *Dec. 26, 2000

[54] MAGNETIC RECORDING MEDIUM

[75] Inventors: Kousaku Tamari, Hiroshima; Takanori Doi, Hatsukaichi; Yasuo Kakihara, Hiroshima; Kenichi Nakata, Otake, all of Japan

[73] Assignee: Toda Kogyo Corporation, Hiroshima-ken, Japan

[*] Notice: This patent is subject to a terminal disclaimer.

[21] Appl. No.: 09/161,999

[22] Filed: Sep. 29, 1998

[30] Foreign Application Priority Data

Sep. 30, 1997 [JP] Japan .................................. 9-284574

[51] Int. Cl.$^7$ .............................................. G11B 5/66
[52] U.S. Cl. ..................... 428/332; 428/336; 428/694 T; 428/900
[58] Field of Search .................................. 428/332, 336, 428/694 T, 900

[56] References Cited

U.S. PATENT DOCUMENTS 5,601,908  2/1997  Tamari ................................. 428/212
5,851,582  12/1998  Tamari ................................. 427/130

FOREIGN PATENT DOCUMENTS 0 586 142 A1  3/1994  European Pat. Off. .
0 673 021 A1  9/1995  European Pat. Off. .

*Primary Examiner*—Leszek Kiliman
*Attorney, Agent, or Firm*—Nixon & Vanderhye

[57] ABSTRACT

A magnetic recording medium of the present invention comprises:

a substrate; and a cobalt-containing maghemite thin film formed on said substrate, containing cobalt at a molar ratio of cobalt to iron of not more than 0.06:1, having either a spacing of a (311) plane of not more than 2.510 Å, a spacing of a (222) plane of not more than 2.415 Å or a spacing of a (220) plane of not more than 2.950 Å, and having a coercive force of not less than 1,800 Oe.

Such a magnetic recording medium has as high a coercive force as possible, specifically not less than 1,800 Oe, and exhibits an excellent stability independent to change in passage of time and a large output in a high recording frequency region.

8 Claims, No Drawings

MAGNETIC RECORDING MEDIUM

BACKGROUND OF THE INVENTION

The present invention relates to a magnetic recording medium, and more particularly, to a magnetic recording medium having as low a cobalt content as possible, specifically a molar ratio of cobalt to iron of not more than 0.06:1 and as high a coercive force as possible, specifically not less than 1,800 Oe, and exhibiting an excellent stability independent to change in passage of time and a large output in a high recording frequency region.

In recent years, in magnetic recording apparatuses such as a hard disc drive, there has been a remarkable tendency that information devices or systems used therewith are miniaturized and required to have a high reliability. In association with such a recent tendency, in order to deal with a large capacity data, there is an increasing demand for magnetic recording media on which information can be stored with a high density.

In order to fulfill such requirements, the magnetic recording media have been strongly required to have as high a coercive force as possible.

As magnetic recording media having a large coercive force, there are widely known those comprising a substrate and a magnetic thin film formed on the substrate.

The magnetic thin films which have been already put into practice, are generally classified into magnetic iron oxide thin films composed of maghemite, etc. (refer to "Technical Report of Electronic Telecommunication Institute", published by Electronic Telecommunication Institute, (1981) MR81-20, pp. 5 to 12), and alloy thin films composed of Co—Cr alloy or the like.

The magnetic iron oxide thin films are excellent in oxidation resistance or corrosion resistance because maghemite is already oxidized. Therefore, the magnetic iron oxide thin films can show an excellent stability independent to change in passage of time, i.e., less change in magnetic properties with passage of time. However, the coercive force of the magnetic iron oxide thin films is as low as at most about 700 Oe.

Whereas, the alloy thin films have a coercive force as high as not less than about 2,000 Oe. However, the alloy thin films tend to be readily oxidized, so that the stability independent to change in passage of time is deteriorated.

In order to prevent magnetic properties of these alloy thin films from being deteriorated due to the oxidation, the surfaces of the alloy thin films have been coated with a protective film, e.g., a carbon film having usually a thickness of about 100 to about 200 Å. However, in such a case, a distance between a magnetic write head and a magnetic recording layer becomes increased by the thickness of the carbon film, resulting in large loss due to the magnetic spacing, which disables the magnetic recording medium to be applied to high-density recording.

In consequence, it has been attempted to enhance the coercive force and saturation magnetization of the above-mentioned magnetic iron oxide thin films which are excellent in oxidation resistance, corrosion resistance and stability independent to change in passage of time, by incorporating cobalt or the like thereinto. The magnetic iron oxide thin films containing cobalt, etc., have been already put into practice.

In the magnetic cobalt-containing iron oxide thin films, the more the cobalt content, the higher the coercive force thereof becomes. However, with the increase of cobalt content, the stability independent to change in passage of time of these magnetic iron oxide thin films tend to be deteriorated by adverse influences of heat or the like.

Thus, at the present time, there has been a strong demand for providing magnetic recording media for high-density recording which are suitable for use in current magnetic recording systems equipped with a ring-type magnetic write head. For this reason, various kinds of magnetic recording media mentioned above have been extensively developed. Among them, the magnetic iron oxide thin films having excellent oxidation resistance and corrosion resistance have been considered to be most useful, so that it have been more strongly demanded to improve properties of these magnetic iron oxide thin films.

That is, as described above, the magnetic iron oxide thin films have been strongly required not only to have a high coercive force even when the cobalt content therein is as low as possible, but also to exhibit a large output in a high recording frequency region.

Conventionally, as typical magnetic iron oxide thin films, there are known maghemite films. It is also known that cobalt can be incorporated into the maghemite in order to enhance the coercive force thereof (Japanese Patent Publications (KOKOKU) Nos. 51-4086(1976) and 5-63925 (1993), and "CERAMICS", published by Japan Ceramics Institute (1986), Vol. 24, No. 1, pp. 21 to 24).

More specifically, in Japanese Patent Publication (KOKOKU) No. 51-4086(1976), there is described a magnetic thin film memory comprising a ceramic substrate made of a high-purity alumina ceramic material which has a high density and is free from damaging memory properties of ferrite due to the reaction therewith even at an elevated temperature of 1,000 to 1,300° C. to produce the ferrite, and a cobalt-based spinel-type ferrite film formed on the substrate and having a composition represented by the general formula of $Co_{(1-x)}Fe_{(2+x)}O_4$ where $-0.2 \leq x \leq 0.3$, the ferrite film being composed of fine crystalline aggregates of the ferrite.

In Japanese Patent Publication (KOKOKU) No. 5-63925 (1993), there is described a process for producing a magnetic iron oxide thin film having a high coercive force, comprising reactive sputtering an iron alloy as a target in an oxidization atmosphere of argon and oxygen to directly form ferromagnetic oxide magnetite ($Fe_3O_4$) of a non-stoichiometric composition having a resistivity of $1 \times 10^{-1}$ to $8 \times 10^{-1}$ $\Omega$.cm, and heat-treating the ferromagnetic oxide magnetite ($Fe_3O_4$) having the above-mentioned resistivity in an atmosphere at a temperature of 280 to 350° C., thereby producing ferromagnetic oxide $\gamma$—$Fe_2O_3$ having a high coercive force.

At the present time, as the magnetic recording media for high-density recording which are suitable for use in current magnetic recording systems using a ring-type magnetic write head, there have been demanded those having a higher coercive force, an excellent stability independent to change in passage of time, and a large output in a high recording frequency region. However, there have not been provided yet such magnetic recording media having all of the above-mentioned properties.

That is, the above-mentioned known cobalt-containing maghemite thin films are still unsatisfactory in coercive force relative to the amount of cobalt contained. When it is attempted to obtain a high coercive force, specifically not less than 1,800 Oe, it is necessary to incorporate a large amount of cobalt so that the molar ratio of Co to Fe is more than 0.06:1. In this case, such cobalt-containing maghemite thin film suffers from severe deterioration in magnetic properties with passage of time by adverse influences of heat or the like.

Also, there is a problem that the Co-containing maghemite thin film cannot show a sufficiently large output in a high recording frequency region.

As a result of the present inventors' earnest studies to solve the above problems, it has been found that by forming a Co-containing maghemite thin film on a substrate so as to control a cobalt content of the Co-containing maghemite thin film to such an amount that the molar ratio of Co to Fe is not more than 0.06:1, and to adjust a spacing of a (311) plane to not more than 2.510 Å, a spacing of a (222) plane to not more than 2.415 Å or a spacing of a (220) plane to not more than 2.950 Å, the obtained magnetic recording medium has a coercive force as high as not less than 1,800 Oe, and exhibits an excellent stability independent to change in passage of time and a large output in a high recording frequency region. The present invention has been attained on the basis of the finding.

SUMMARY OF THE INVENTION

It is an object of the present invention to provide a magnetic recording medium for high-density recording, which is suitable for use in current magnetic recording systems using a ring-type magnetic write head, and has a high coercive force and exhibits a large output in a high recording frequency region.

To accomplish the aims, in an aspect of the present invention, there is provided a magnetic recording medium comprising a substrate and a cobalt-containing maghemite thin film formed on the substrate, containing cobalt at a molar ratio of cobalt to iron of not more than 0.06:1, having either a spacing of a (311) plane of not more than 2.510Å, a spacing of a (222) plane of not more than 2.415 Å or a spacing of a (220) plane of not more than 2.950 Å, and having a coercive force of not less than 1,800 Oe.

DETAILED DESCRIPTION OF THE INVENTION

First, the magnetic recording medium according to the present invention is described.

The magnetic recording medium according to the present invention comprises a substrate and a cobalt-containing maghemite thin film as a magnetic thin film formed on the substrate.

The substrate used in the present invention may be made of materials ordinarily used for this purpose, such as glass or the like.

The magnetic thin film of the magnetic recording medium according to the present invention is a cobalt-containing maghemite thin film having a thickness of usually 0.005 to 1.0 µm, preferably 0.01 to 0.5 µm.

In general, maghemite is represented by the formula of $\gamma$—$Fe_2O_3$. However, in the present invention, there may also be used such maghemite containing a small amount of $Fe^{2+}$. The upper limit of the $Fe^{2+}$ content at a molar ratio of $Fe^{2+}$ to $Fe^{3+}$ is preferably 0.3:1.

In addition, the cobalt-containing maghemite thin film may further contain at least one element selected from the group consisting of Mn, Ni, Cu, Ti and Zn which may be usually used to improve various properties thereof, in such an amount that the molar ratio of these elements to Fe is usually about 0.005:1 to about 0.04:1.

The cobalt content in the maghemite thin film is usually not more than 0.06:1, preferably 0.01:1 to 0.06:1, more preferably 0.03:1 to 0.06:1 at a molar ratio of Co to Fe. When the molar ratio of Co to Fe is less than 0.01:1, it may become difficult to obtain a magnetic recording medium having a coercive force as high as not less than 1,800 Oe. On the other hand, when the molar ratio of Co to Fe is more than 0.06:1, it becomes difficult to obtain a magnetic recording medium having an excellent stability independent to change in passage of time.

The cobalt-containing maghemite thin film according to the present invention is controlled to satisfy at least one of the following conditions: i.e., a spacing of a (311) plane is not more than 2.510 Å; a spacing of a (222) plane is not more than 2.415 Å; or a spacing of a (220) plane is not more than 2.950 Å. In this case, if any one condition can be satisfied, it is not required to satisfy the other two conditions.

When all of the above-mentioned three conditions concerning the spacing of the (311), (222) and (220) planes are not satisfied, it is not possible to obtain a magnetic recording medium having a high coercive force. Further, such a magnetic recording medium cannot exhibit a sufficiently large output in a high recording frequency region.

There is a close relationship between the spacing of the (311) plane, the (222) plane or the (220) plane and the coercive force of the cobalt-containing maghemite thin film. In the case where the molar ratio of Co to Fe is the same, there is a tendency that the smaller the spacing, the larger the coercive force becomes.

The spacing of the (311) plane is usually not more than 2.510 Å, preferably not more than 2.509 Å, more preferably not more than 2.506 Å. The lower limit of the spacing of the (311) plane is preferably 2.490 Å.

The spacing of the (222) plane is usually not more than 2.415 Å, preferably not more than 2.400 Å, more preferably not more than 2.399 Å, still more preferably not more than 2.398 Å. The lower limit of the spacing of the (222) plane is preferably 2.385 Å.

The spacing of the (220) plane is usually not more than 2.950 Å, preferably not more than 2.943 Å, more preferably not more than 2.940 Å. The lower limit of the spacing of the plane (220) is preferably 2.920 Å.

The magnetic recording medium of the present invention, shows a saturation magnetization (magnetization value measured at an applied magnetic field of 15 kOe) of preferably 230 to 350 emu/cm$^3$, more preferably 240 to 300 emu/cm$^3$, and a coercive force of usually not less than 1,800 Oe, preferably not less than 2,000 Oe, more preferably not less than 2,200 Oe. In the present invention, especially when the molar ratio of Co to Fe is 0.04:1, the upper limit of the coercive force of the magnetic recording medium is about 3,000 Oe. Incidentally, in the current magnetic recording systems using a ring-type magnetic write head, the upper limit of the coercive force is preferably about 4,000 Oe, more preferably 3,000 Oe.

Besides, the upper limit of the coercive force of the magnetic recording medium of the present invention, means a value measured at an applied magnetic field of 15 kOe which is an upper limit of the coercive force measurable by "vibration sample-type magnetometer" described in detail hereinafter. In addition, with respect to read-write properties of the magnetic recording medium of the present invention when measured by a tester described in Examples hereinafter, the $S_{p-p}/N_{rms}$ is preferably not less than 41 dB, more preferably not less than 42 dB; the recording density whose output is one half of an output obtained at a recording density of 1 kFRPI, is preferably not less than 120, more preferably not less than 130; and the di-pulse ratio is 0.

Next, the process for producing the magnetic recording medium according to the present invention, is described.

The magnetic recording medium according to the present invention can be produced by depositing cobalt-containing magnetite on the substrate by a so-called sputtering method using Co-containing iron alloy as a target while controlling a flow rate of oxygen (CCM) as an amount of oxygen introduced and a deposition rate (nm/min) of the cobalt-containing magnetite, to form a cobalt-containing magnetite thin film on the substrate; and then heat-treating the obtained cobalt-containing magnetite thin film at a temperature of 200 to 450° C. to transform the cobalt-containing magnetite thin film into a cobalt-containing maghemite thin film.

In order to obtain the aimed magnetic recording medium according to the present invention, it is important to control the flow rate of oxygen (CCM) relative to the deposition rate (nm/min) of the cobalt-containing magnetite.

The flow rate of oxygen (CCM) relative to the deposition rate (nm/min) of the cobalt-containing magnetite to obtain the aimed magnetic recording medium according to the present invention, is varied depending upon various conditions having an influence on the oxidation of the cobalt-containing magnetite thin film, such as kind and construction of apparatus used, a total gas pressure, a substrate temperature or an area of target to be sputtered. Therefore, it is difficult to specifically determine the preferred flow rate of oxygen.

However, as a result of many experiments conducted by the present inventors, it has been recognized that there is a tendency that the less the flow rate of oxygen (CCM) relative to the deposition rate (nm/min) of the cobalt-containing magnetite, the smaller the spacing of each of the (311), (222) and (220) planes of the obtained cobalt-containing maghemite thin film becomes.

Accordingly, by conducting various experiments to obtain the flow rate of oxygen (CCM) relative to the deposition rate (nm/min) of the cobalt-containing magnetite at which the spacing of each of (311), (222) and (220) planes becomes smaller than that of the bulk, the deposition rate (nm/min) of the cobalt-containing magnetite and the flow rate of oxygen may be respectively controlled so as to be smaller than the obtained values.

In accordance with the experiments conducted by the present inventors, as described in Examples and Comparative Examples hereinafter, when the deposition rate of the cobalt-containing magnetite is 3.5 nm/min, the flow rate of oxygen (CCM) is usually not more than 0.35, preferably not more than 0.27, more preferably not more than 0.25. The lower limit of the flow rate of oxygen (CCM) is preferably 0.18. When the flow rate of oxygen is more than 0.35, hematite may tend to be formed in the obtained cobalt-containing maghemite thin film, resulting in decrease in saturation magnetization thereof. On the other hand, when the flow rate of oxygen is less than 0.18, metal iron (Fe) or wustite (FeO) may tend to be formed in the obtained cobalt-containing maghemite thin film, resulting in decrease in coercive force thereof.

The important point of the present invention resides in that in the case where the cobalt content of the cobalt-containing maghemite thin film formed on the substrate is adjusted so that the molar ratio of cobalt to iron is not more than 0.06:1, and any of conditions of a spacing of a (311) plane of not more than 2.510 Å, a spacing of a (222) plane of not more than 2.415 Å and a spacing of a (220) plane of not more than 2.950 Å is satisfied, there can be obtained a magnetic recording medium having a high coercive force and a large output in a high recording frequency region.

The reason why the magnetic recording medium having such excellent properties can be obtained by satisfying the above requirements of the present invention, is considered as follows. That is, due to the fact that the aimed magnetic recording medium cannot be obtained in any of the cases where the cobalt-containing maghemite thin film has the specified spacing but the cobalt content is out of the above-specified range and where the cobalt content of the cobalt-containing maghemite thin film is within the above-specified range but the above-specified condition concerning the spacing is not satisfied, there exists a synergistic effect based on the specified cobalt content and the specified spacing in the cobalt-containing maghemite thin film.

With respect to the spacing of the respective lattice planes of the cobalt-containing maghemite thin film according to the present invention, even though the cobalt-containing magnetite thin film is transformed into the cobalt-containing maghemite thin film at the same heating temperature, the spacing of each of the (311), (222) and (220) planes is caused to change by varying the flow rate of oxygen upon formation of the cobalt-containing magnetite thin film. Due to this fact, it can be recognized that the change of the spacing is not caused by the difference in thermal expansion coefficient between the substrate, and the cobalt-containing maghemite upon the heat treatment, but is caused by reduction in spacing of the cobalt-containing maghemite thin film itself.

The magnetic recording medium according to the present invention can have a high coercive force even at less cobalt content and exhibit a large output in a high recording frequency region, and is, therefore, suitable as those for high-density recording and applicable to current magnetic recording systems using a ring-type magnetic write head.

In addition, in the production of the magnetic recording medium according to the present invention, since the cobalt-containing magnetite thin film can be heat-treated and transformed into the cobalt-containing maghemite thin film at a temperature as low as not more than 450° C., it is not required to use a substrate having a heat-resistance, and ordinarily used materials such as glass, resulting in good productivity with industrial and economical advantages.

EXAMPLES

The present invention will now be described in more detail with reference to the following examples and comparative examples, but the present invention is not restricted to those examples and various modifications are possible within the scope of the invention.

(1) The magnetostatic properties such as coercive force and saturation magnetization (measured under an external magnetic field of 15 kOe) of the magnetic recording medium, are expressed by values measured by "Vibrating Sample Magnetometer VSM" (manufactured by TOEI KOGYO CO., LTD.).

(2) The X-ray diffraction spectrum of the magnetic recording medium is expressed by values measured by "X-ray Diffractometer RAD-II A" (manufactured by RIGAKU DENKI CO., LTD.).

The measuring conditions of the X-ray diffraction spectrum are as follow: lamp used: Fe; lamp voltage: 40 kV; lamp current: 25 mA; sampling width of goniometer: 0.010°; scanning speed: 1.000°/min; light-emitting (divergent) slit: 1°; scattering slit: 1°; light-receiving slit: 0.30 mm.

The region corresponding to a diffraction angle (2θ) of 30.00° to 60.00° was measured under the above-mentioned conditions.

(3) The read-write properties such as reproduced output or di-pulse of the magnetic recording medium are evaluated as follows.

That is, after a magnetic film was formed on a glass disc and then the surface of the magnetic film was coated with a perfluoropolyether-based lubricant "FOMBLIN Z DOL" (trade name: produced by AUSIMONT K. K.), an MIG head for VCR was run on the resultant magnetic recording medium while contacting therewith at a gap length of about 0.2 μm and a track width of 21 μm. The respective read-write properties were evaluated by using "Recording and Reproducing Tester M-84V" (manufactured by FUJITSU AUTOMATION CO., LTD.).

Specifically, the noise value ($N_{rms}$) was analyzed by "Spectrum Analyzer TR4171" (manufactured by ADVANTEST CO., LTD.) at a velocity of 3.0 m/s.

The reproduced output ($S_{p-p}$) and di-pulse ratio were analyzed by "Oscilloscope VP5514A" (manufactured by PANASONIC CO., LTD.) at a velocity of 3.0 m/s. In the present invention, the di-pulse ratio of 0 (zero) is desirable.

Example 1

Using a high recording frequency high-rate sputtering apparatus SH-250H-T06 (manufactured by ULVAC JAPAN LTD.), a metal alloy target (Fe+4 wt. % Co) was reactive sputtered at a distance between a substrate and the target to 80 mm, at a temperature of 250° C. in an atmosphere of argon and oxygen flow rate of 0.27 CCM, at an oxygen partial pressure of 0.23 mTorr and at a total pressure of 9 mTorr, thereby depositing a cobalt-containing magnetite thin film having a thickness of 0.1 μm on the substrate at a deposition rate of 4.0 nm/min.

The resultant film was heat-treated at 270° C. for one hour in an atmosphere, thereby obtaining a cobalt-containing maghemite thin film.

The cobalt-containing maghemite film was subjected to the measurement of X-ray diffraction spectrum, so that diffraction peaks of the (311) plane having a spacing of 2.506 Å and the (111) plane having a spacing of 2.412 Å, were observed.

The magnetostatic property of the cobalt-containing maghemite was measured, so that it was determined that the coercive force thereof was 3,000 Oe and the saturation magnetization thereof was 255 emu/cm³.

The read-write properties of the cobalt-containing maghemite film were measured, so that it was determined that the $S_{p-p}/N_{rms}$ obtained upon reproduced signals recorded at a recording density of 100 kFRPI was 44 dB, and the recording density whose reproduced output was one half of a reproduced output obtained upon reproduced signals recorded at a recording density of 1 kFRPI, $D_{50}$ was 133 kFRPI.

In addition, the isolated reproduced waveform of the cobalt-containing maghemite obtained upon reproduced signals recorded at a recording density of 1 kFRPI, was observed by the oscilloscope, so that it was determined that the waveform exhibited a unimodal pulse shape corresponding to a di-pulse ratio of 0.

Examples 2 to 5 and Comparative Examples 1 to 3

The same procedure as defined in Example 1 was conducted except that cobalt content of the cobalt-containing magnetite thin film, oxygen flow rate and film-depositing speed upon formation of the thin film, and heat-treating temperature and time were changed variously, thereby obtaining magnetic recording media.

The production conditions used and various properties of the obtained magnetic recording media are shown in Tables 1 and 2.

TABLE 1

| Examples and Comparative Examples | Cobalt-containing magnetite thin film | | | Heat treatment | |
|---|---|---|---|---|---|
| | Cobalt content (molar ratio of Co to Fe) | Oxygen flow rate upon film formation | Film-deposition rate (nm/min) | Temperature (° C.) | Time (min) |
| Example 2 | 0.04 | 0.22 CCM | 3.3 | 260 | 120 |
| Example 3 | 0.04 | 0.30 CCM | 5.0 | 290 | 80 |
| Example 4 | 0.06 | 0.22 CCM | 3.3 | 300 | 60 |
| Example 5 | 0.03 | 0.21 CCM | 3.3 | 320 | 60 |
| Comparative Example 1 | 0.04 | 0.26 CCM | 3.3 | 320 | 60 |
| Comparative Example 2 | 0.04 | 0.22 CCM | 3.3 | — | — |
| Comparative Example 3 | 0 | 0.22 CCM | 3.4 | 320 | 60 |

TABLE 2

| Examples and Comparative Examples | Magnetic recording medium | | |
|---|---|---|---|
| | Composition | Cobalt content (molar ratio of Co to Fe) | Thickness (μm) |
| Example 2 | cobalt-containing maghemite | 0.04 | 0.1 |
| Example 3 | cobalt-containing maghemite | 0.04 | 0.1 |
| Example 4 | cobalt-containing maghemite | 0.06 | 0.1 |
| Example 5 | cobalt-containing maghemite | 0.03 | 0.1 |
| Comparative Example 1 | cobalt-containing maghemite | 0.04 | 0.1 |
| Comparative Example 2 | cobalt-containing maghemite | 0.04 | 0.1 |
| Comparative Example 3 | Maghemite | 0 | 0.1 |

| Examples and Comparative Examples | Magnetic recording medium | | | | |
|---|---|---|---|---|---|
| | Magnetic thin film Spacing (Å) | | | Magnetostatic properties | |
| | (311) | (222) | (220) | Saturation magnetization (emu/cm³) | Coercive force (Oe) |
| Example 2 | 2.507 | — | — | 266 | 2850 |
| Example 3 | 2.506 | 2.412 | — | 255 | 3000 |
| Example 4 | 2.508 | — | 2.940 | 287 | 3400 |
| Example 5 | 2.506 | 2.411 | — | 248 | 2450 |
| Comparative Example 1 | 2.512 | 2.418 | — | 280 | 1500 |
| Comparative Example 2 | 2.530 | 2.424 | — | 320 | 800 |
| Comparative Example 3 | 2.508 | — | — | 260 | 400 |

| Examples and Comparative Examples | Magnetic recording medium Read-write properties | | |
|---|---|---|---|
| | $S_{p-p}/N_{rms}$ (dB) | $D_{50}$ (kFRPI) | Di-pulse Ratio |
| Example 2 | 44 | 130 | 0 |
| Example 3 | 44 | 132 | 0 |

TABLE 2-continued

| | | | |
|---|---|---|---|
| Example 4 | 44 | 134 | 0 |
| Example 5 | 43 | 124 | 0 |
| Comparative Example 1 | 40 | 116 | 0 |
| Comparative Example 2 | 39 | 110 | 0 |
| Comparative Example 3 | 38 | 100 | 0 |

Comparative Example 4

Using a high recording frequency high-rate sputtering apparatus SH-250H-T06 (manufactured by ULVAC JAPAN LTD.), a metal alloy target (Fe+4 wt. % Co) was reactive sputtered at a distance between a glass substrate and the target to 80 mm, at a temperature of 250° C. in an atmosphere of argon and oxygen flow rate of 0.27 CCM, at an oxygen partial pressure of 0.23 mTorr and at a total pressure of 9 mTorr, thereby depositing a cobalt-containing magnetite thin film having a thickness of 0.1 μm on the glass substrate at a deposition rate of 3.3 nm/min.

The resultant film was heat-treated at 300° C. for one hour in an atmosphere, thereby obtaining a cobalt-containing maghemite thin film.

The cobalt-containing maghemite film was subjected to the measurement of X-ray diffraction spectrum, so that diffraction peaks of the (311) plane having a spacing of 2.513 Å and the (222) plane having a spacing of 2.419 Å, were observed.

The magnetostatic properties of the cobalt-containing maghemite were measured, so that it was determined that the coercive force thereof was 1,400 Oe and the saturation magnetization thereof was 270 emu/cm$^3$.

The read-write properties of the cobalt-containing maghemite film were measured, so that it was determined that the $S_{p-p}/N_{rms}$ obtained upon reproduced signals recorded at a recording density of 100 kFRPI was 38 dB, and the recording density whose reproduced output was one half of a reproduced output obtained upon reproduced signals recorded at a recording density of 1 kFRPI, D50 was 108 kFRPI.

In addition, the isolated reproduced waveform of the cobalt-containing maghemite obtained upon reproduced signals recorded at a recording density of b 1kFRPI, was observed by the oscilloscope, so that it was determined that the waveform exhibited a di-pulse shape corresponding to a di-pulse ratio of 0.2.

What is claimed is:

1. A magnetic recording medium consisting essentially of:

a substrate; and a cobalt-containing maghemite thin film formed on said substrate, containing cobalt at a molar ratio of cobalt to iron of not more than 0.06:1, having either a spacing of a (311) plane of not more than 2.510 Å, a spacing of a (222) plane of not more than 2.415 Å or a spacing of a (220) plane of not more than 2.950 Å, and having a coercive force of not less than 1,800 Oe.

2. A magnetic recording medium according to claim 1, wherein said cobalt-containing maghemite thin film further contains at least one element selected from the group consisting of Mn, Ni, Cu, Ti and Zn in such an amount that the molar ratio of said element to iron is 0.005:1 to 0.04:1.

3. A magnetic recording medium according to claim 1, wherein the molar ratio of cobalt to iron in said cobalt-containing maghemite thin film is 0.01:1 to 0.06:1.

4. A magnetic recording medium according to claim 1, wherein said cobalt-containing maghemite thin film has a thickness of 0.005 to 1.0 μm.

5. A magnetic recording medium according to claim 1, wherein the spacing of the (311) plane is 2.490 to 2.509 Å.

6. A magnetic recording medium according to claim 1, wherein the spacing of the (222) plane is 2.385 to 2.400 Å.

7. A magnetic recording medium according to claim 1, wherein the spacing of the (220) plane is 2.920 to 2.943 Å.

8. A magnetic recording medium according to claim 1, wherein the saturation magnetization of said magnetic recording medium is 230 to 350 emu/cm$^3$.

* * * * *